(No Model.)

H. F. HODGES.
LUBRICATOR.

No. 290,428. Patented Dec. 18, 1883.

Witnesses.
E. Planta
Thos. F. Currier

Inventor.
H. F. Hodges
by J. H. Adams
Atty.

United States Patent Office.

HORACE F. HODGES, OF CHELSEA, ASSIGNOR TO CHARLES F. PAYNE, OF GROVELAND, AND GEORGE H. SPENCER, OF FITCHBURG, MASS.

LUBRICATOR.

SPECIFICATION forming part of Letters Patent No. 290,428, dated December 18, 1883.

Application filed May 14, 1883. (No model.)

*To all whom it may concern:*

Be it known that I, HORACE F. HODGES, a citizen of the United States, residing at Chelsea, in the county of Suffolk and State of Massachusetts, have invented a new and useful Improvement in Sight-Feeds for Lubricators, of which the following is a specification.

My invention consists in a method of and means for feeding the oil from a lubricator to the parts to be lubricated, so that the oil, while being so fed, will be distinctly indicated to the sight.

Figure 1:
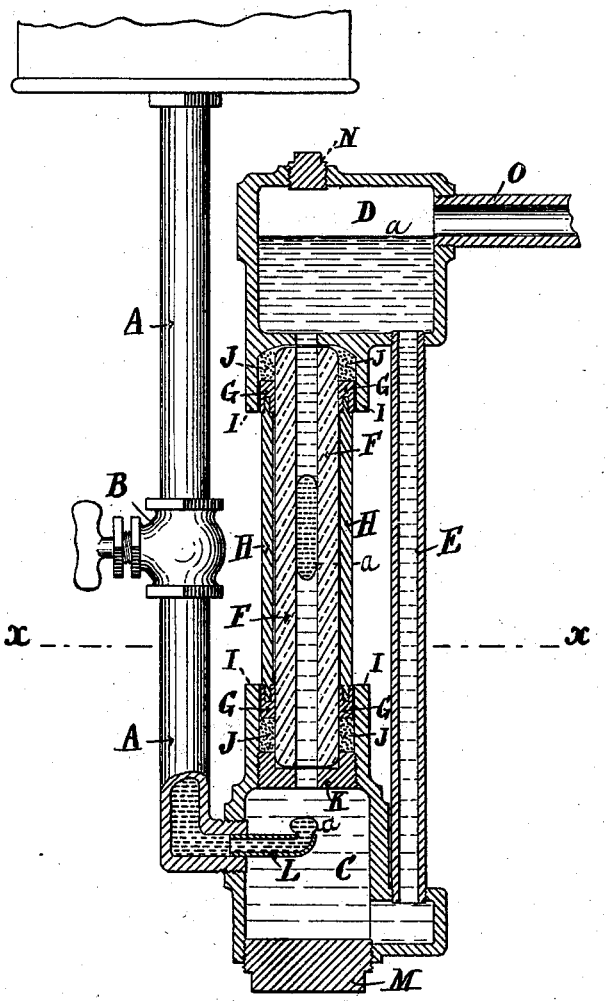
Figure 2:
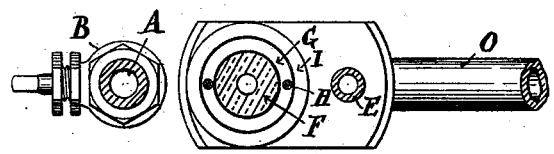
Figure 3:
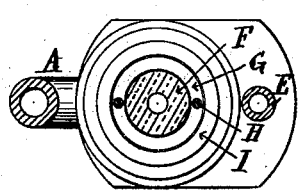

Referring to the accompanying drawings, Figure 1 is a vertical section of my invention. Fig. 2 is a transverse section on the line $x\,x$ of Fig. 1, looking up; and Fig. 3, a section on the same line, looking down.

A is a feed-pipe leading from an oil-reservoir, and provided with a valve at B for regulating the supply of oil.

C is a chamber connecting with the lower end of pipe A at one side, and also connecting, by means of a tube, E, with an upper chamber, D, the three containing water or other suitable liquid, the surface of the water in chamber D being on a level with the lower portion of the tube O, the latter being the delivery-pipe leading to the parts to be lubricated.

F is a tube, of transparent material, connecting the top of chamber C with the bottom of chamber D, and is of such bore or internal diameter as to prevent the oil and water from passing each other through the same.

G G are metal collars or rings surrounding the tube F near the top and bottom, and fitted in glands I I, and are firmly connected together by means of rods H H, one on each side.

J J are packing-rings, of rubber or other suitable material, interposed between the collars G G and the inner ends of the glands I I.

K is a nut screwed into the lower gland I, and forms the bottom of said gland. Each gland has an orifice corresponding with the bore of the sight-tube F at top and bottom.

L is a short tube connecting with the lower end of tube A, and capable of being pushed within said tube, so as to enable the nut K to be inserted in the lower gland I and turned in the same for tightening the packing when necessary. The nut K is passed through an opening in the bottom of the chamber C, which opening is closed by screw-plug M.

In the top of chamber D is an opening provided with a screw-plug, N, through which opening is supplied the liquid for filling the chambers and connecting-tubes with any suitable liquid, which liquid is to be of greater specific gravity than oil, in order to allow the latter to rise in said liquid.

In packing the tube F, the collars G G, connected by the rods H H, are first placed upon the tube and with the packing J at each end, the screw-plug M and nut K being removed, and the tube L being pushed back within the tube A, so as to leave a clear passage in chamber C. The tube F, with its collars and rings, is then inserted, and the nut K replaced and screwed up, so as to tighten the packing in both glands above and below at the same time. The tube L is then drawn out and the plug M screwed in. The chambers C D are then filled with the water or other suitable liquid through the opening at N in chamber D up to a level with the bottom of tube O. Upon opening the valve B, the oil (represented by $a$) passes through the pipe A and out of the pipe L to a point near the lower end of the tube F, into which it passes and ascends, owing to its buoyancy. The tubes F and E constitute a siphon, whose columns are of equal length, and consequently, when filled with the same liquid, the columns will be equally balanced; but if a lighter liquid—that is, one of less specific gravity, such as oil—be introduced into one of the tubes, as at F, then the column in E will be the heavier, and will descend, while column in tube F will rise and carry the oil with it to the surface of the liquid in chamber D, whence it passes into pipe O. The balance is then restored in tubes F and E until more oil is admitted, when the operation is repeated, thus insuring a constant and steady supply of oil, the required amount of which is regulated at pleasure by the valve B.

What I claim as my invention is—

1. The method of supplying oil to the parts to be lubricated, the same consisting in passing the oil from the source of supply through a pipe, A, into and through a water-chamber, C, tube F to a chamber, D, and thence through a pipe, O, the oil in pipe F acting to effect a continuous circulation of water from chamber D, through pipe E, chamber C, and pipe F, substantially as set forth.

2. The combination of tube A, sliding tube L, chamber C, transparent tube F, chamber D, and tube E, substantially as and for the purpose specified.

3. The combination, with the tube F, of the glands I I, collars G G, and connections H H, packing J J, and the internal nut, K, substantially as specified.

In testimony whereof I have signed my name to this specification in the presence of two subscribing witnesses.

HORACE F. HODGES.

Witnesses:
J. H. ADAMS,
E. PLANTA.